United States Patent [19]

Schroeder

[11] 4,441,728

[45] Apr. 10, 1984

[54] BICYCLE SAIL

[76] Inventor: Warren C. Schroeder, 200 Cambridge Dr., Hagerstown, Md. 21740

[21] Appl. No.: 290,927

[22] Filed: Aug. 10, 1981

[51] Int. Cl.³ ............................................. B62B 15/00
[52] U.S. Cl. ................................. 280/213; 280/289 S; 296/78.1
[58] Field of Search ............ 280/213, 289 S, 1, 1.1 R, 280/289 H, 210, 212, 810; 296/78.1; 114/39, 103; 180/2.2, 2 R

[56] References Cited

U.S. PATENT DOCUMENTS

| 639,107 | 12/1899 | Sorensen | 280/213 |
| 947,731 | 1/1910 | Couder | 280/213 |
| 3,836,176 | 9/1974 | Ylvisaker | 280/213 |
| 3,986,722 | 10/1976 | Patterson | 280/213 X |
| 3,994,508 | 11/1976 | Danner | 280/213 |

FOREIGN PATENT DOCUMENTS

| 939853 | 5/1948 | France | 280/213 |
| 2416828 | 10/1979 | France | 280/213 |
| 442710 | 11/1948 | Italy | 280/289 H |
| 229341 | 1/1944 | Switzerland | 296/78.1 |
| 21468 | of 1902 | United Kingdom | 280/213 |

Primary Examiner—Joseph F. Peters, Jr.
Assistant Examiner—Mitchell J. Hill

[57] ABSTRACT

A convertible moveable transparent sail adapted for bicycle to increase forward thrust, journaled for repositioning by cyclist in operation and readily reconfigurable for stowage.

10 Claims, 12 Drawing Figures

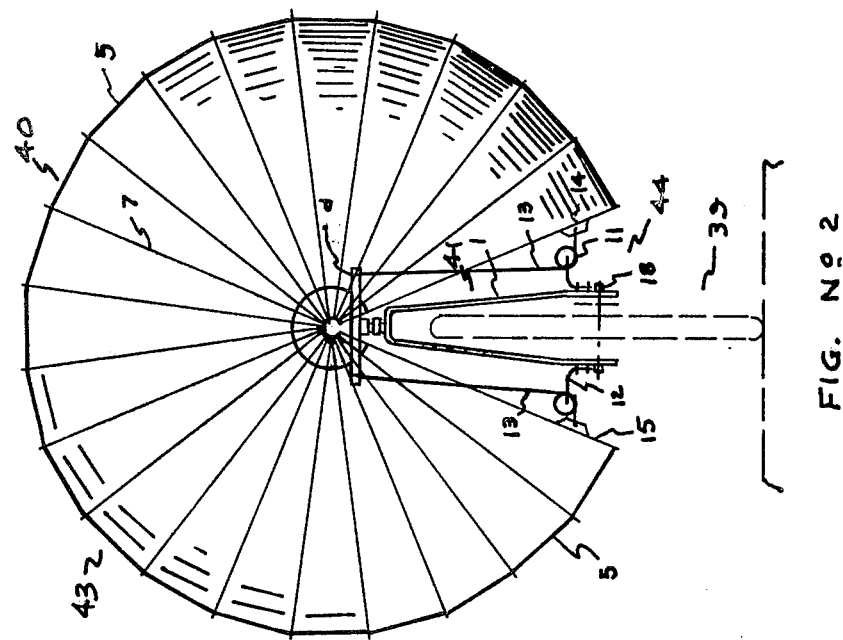
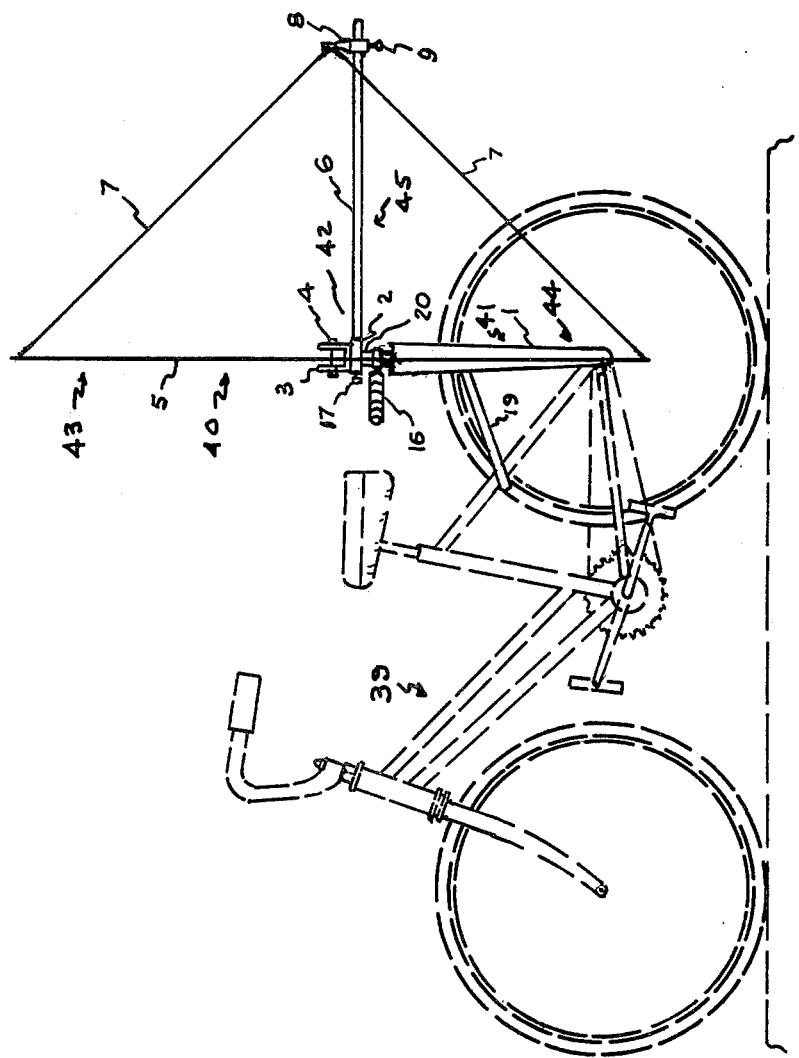
FIG. N° 2
FIG. N° 1

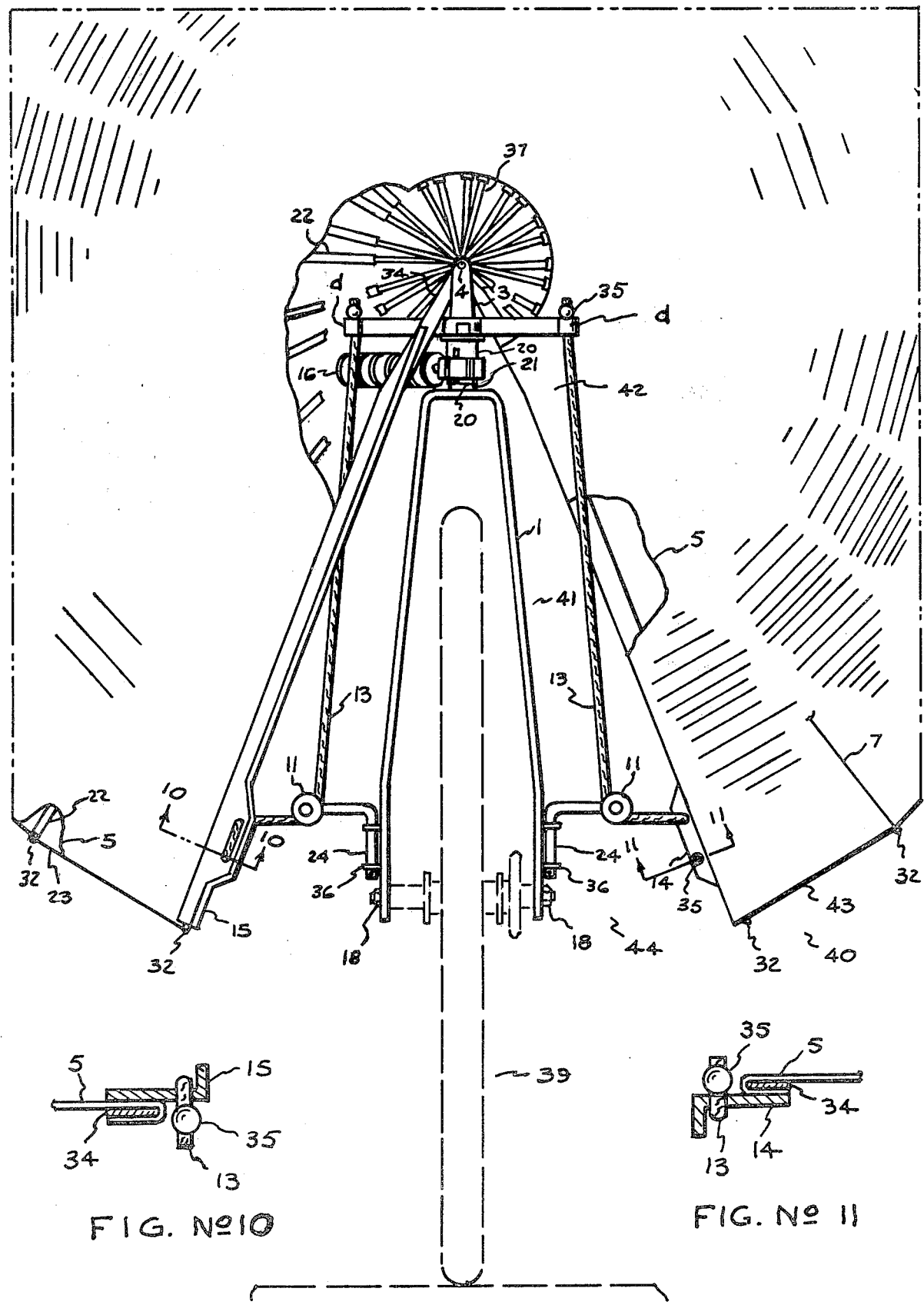
FIG. Nº 10
FIG. Nº 11
FIG. Nº 3

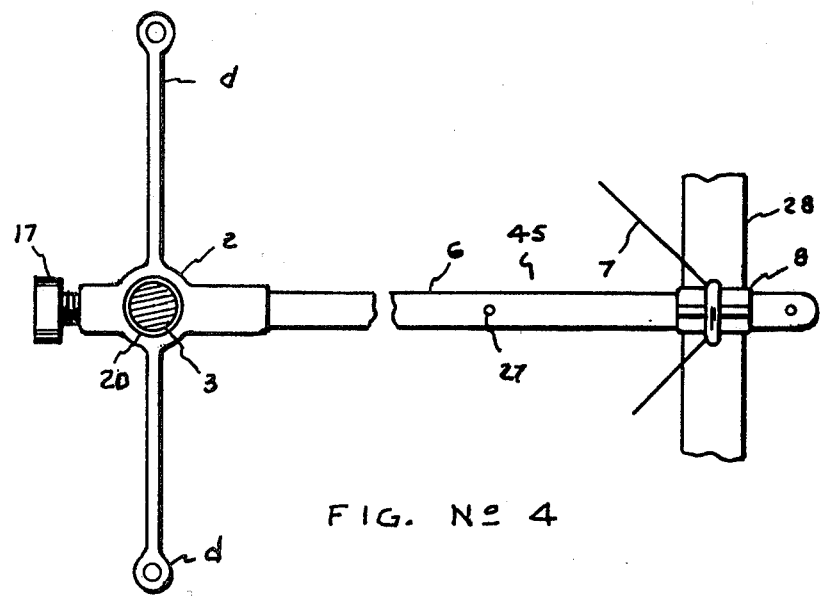
FIG. Nº 4
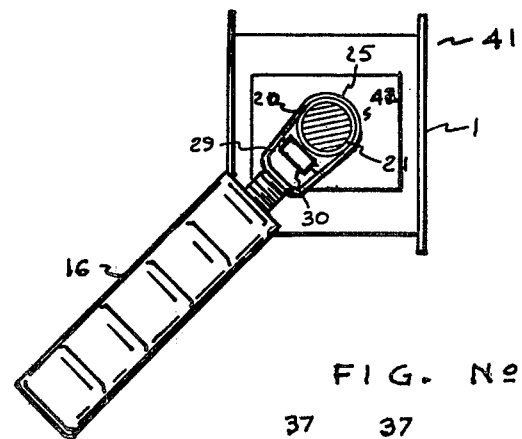
FIG. Nº 5
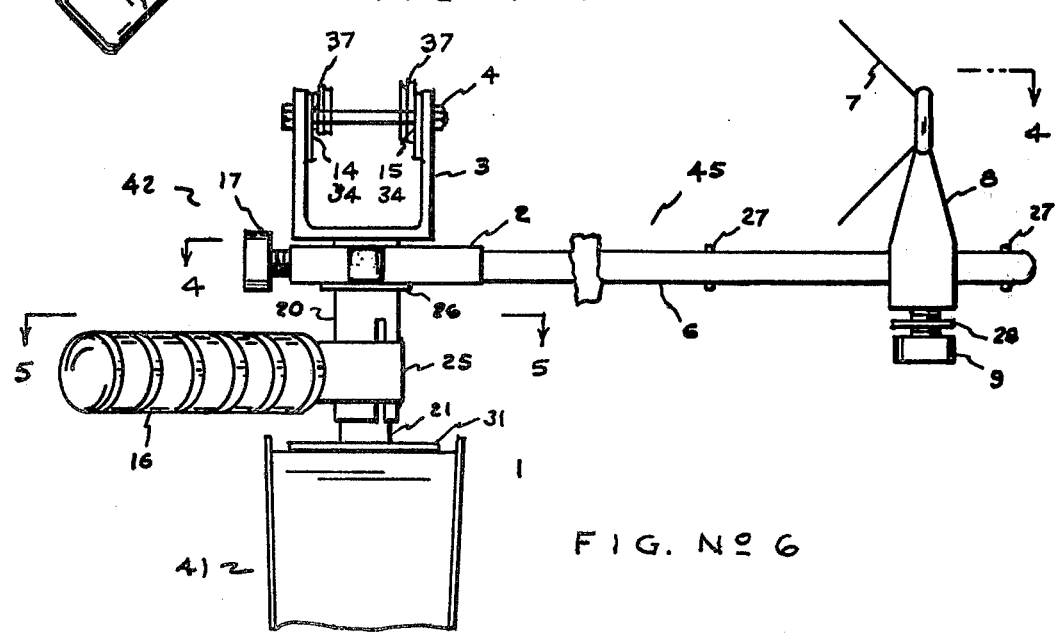
FIG. Nº 6

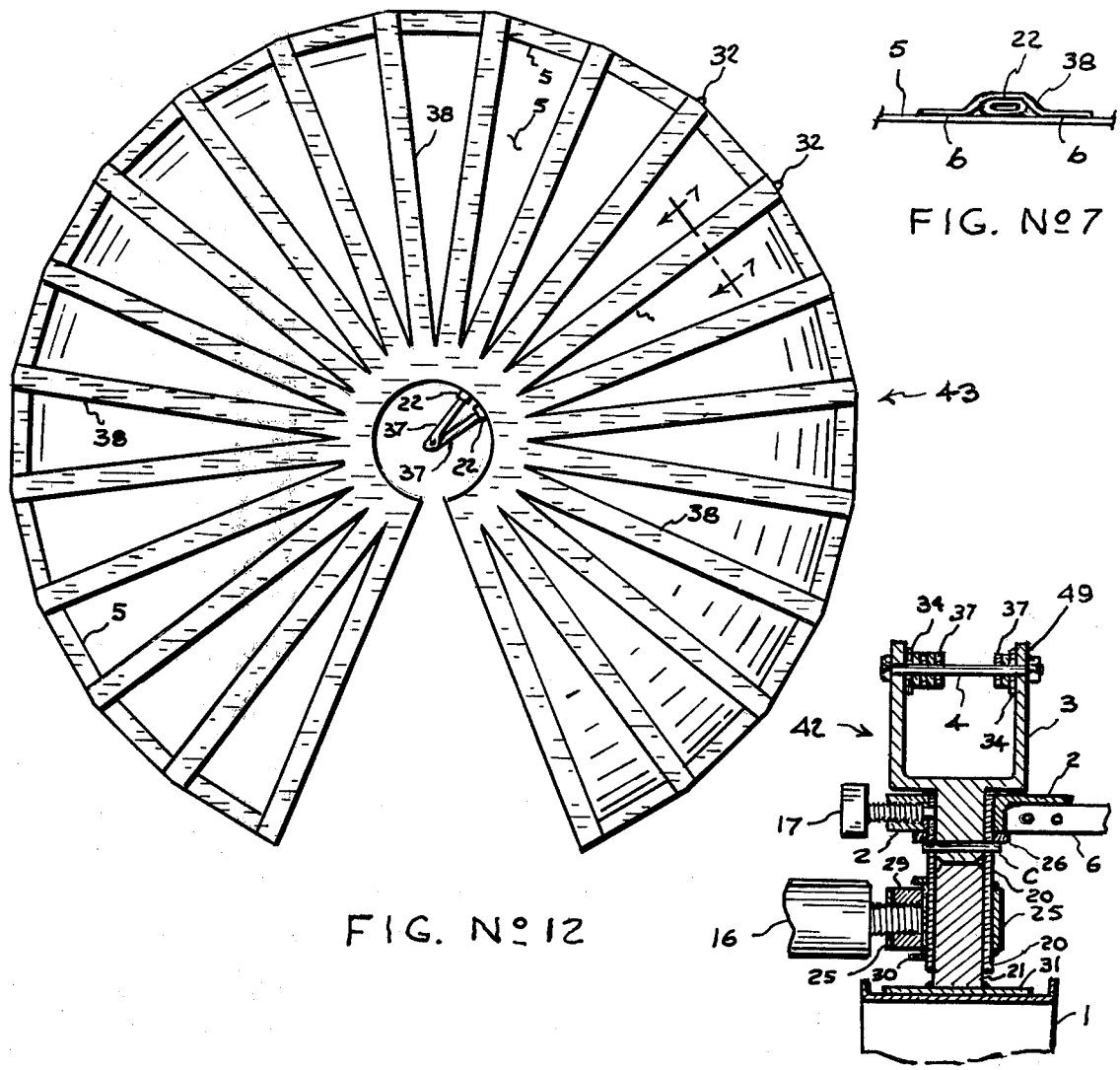
FIG. Nº 7
FIG. Nº 12
FIG. Nº 8
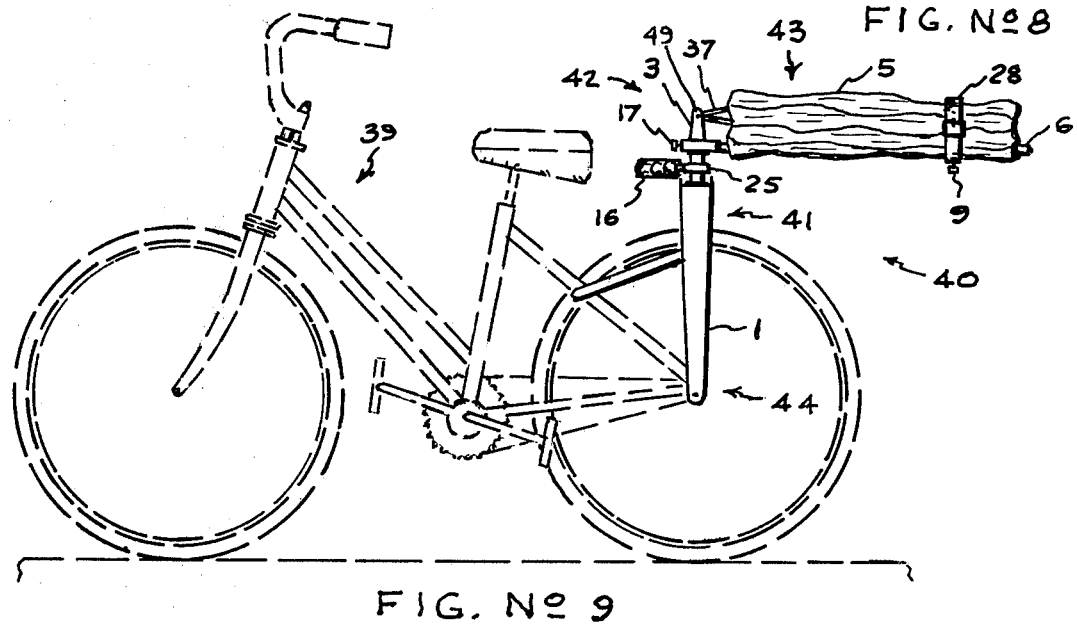
FIG. Nº 9

BICYCLE SAIL

BACKGROUND OF THE INVENTION

This invention is to provide a conveniently operable and highly efficient bicycle wind trust assist to the forward movement of a bicycle in the form of a sail. A sail that can be erected, dismantled or removed in seconds and one that can take advantage of the wind direction in an arc that exceeds 200 degrees. The sail can be reoriented by the operator from the bicycle seat while in operation of the cycle. This allows operator to take full advantage of the full effective wind directional range and change. The use of the sail improves visibility of the bicycle from other vehicle operators thereby improving the safety of the cyclist.

The bicycle sail allows the cycle enthusiast an inexpensive means of free transportation energy—the wind, "sailing on wheels".

BRIEF DESCRIPTION OF THE DRAWINGS

FIG. 1 shows side elevation view of bicycle and sail apparatus.

FIG. 2 shows rear elevation view of the sail apparatus.

FIG. 3 shows enlarged partial rear elevation view of sail apparatus including base, journaled mounting, sail tension mechanism and sail.

FIG. 4 shows the sail stabilizer system.

FIG. 5 shows journaled mounting common to line 5.

FIG. 6 shows side elevation view of journaled mounting and sail stabilizer.

FIG. 7 shows sail and sail stay along line 7—7 in FIG. 12.

FIG. 8 shows typical cross section of journaled mounting along center line of vertical axis.

FIG. 9 shows side elevation of bicycle and folded sail in stowage position.

FIG. 10 shows elevation view along line 10 in FIG. 3.

FIG. 11 shows elevation view along line 11 in FIG. 3.

FIG. 12 shows front elevation view of sail.

DESCRIPTION OF THE PREFERRED EMBODIMENTS

Referring now to drawing in FIGS. 1 and 2 a standard constructed bicycle 39 is shown along with the embodiments of this invention. The sail apparatus 40 in general terms includes a base 41, a journaled mounting 42, a sail 43, a sail tension mechanism 44 and a sail stabilizer 45.

Mounted in a manner permitting the sail apparatus 40 to rotate sufficiently to exert a forward thrust on said sail through a wind range of 200 degrees and at such height whereby said thrust upon said sail is below the center of gravity of the vehicle operator.

Sail apparatus 40 is a wind sail and is added to bicycle 39 to improve its forward thrust when available wind exists in desired direction. Base 41 shown in FIGS. 1, 2, 3 and 9 includes support structure 1, a U-shaped structure running over and above rear wheel and down each side in a parallel manner journaled at lower ends by bores matching rear bicycle axle and secured by nuts 18, FIG. 3. It is supported generally vertically in this position by two braces 19 attached to each side of bicycle frame and structure 1, as shown in FIG. 1. Base 41 includes spindle 21, FIG. 8, secured to mounting pad 31, secured to structure 1 providing the vertical axis journaled with journaled mounting 42. A rotation about this axis repositions sail 43 to the desired wind setting.

FIG. 2 shows elevation view of sail apparatus 40 viewed from the rear of the bicycle while FIG. 12 shows the elevation view of sail 43 viewed from front of the bicycle. Sail 43 comprises a transparent web 5, segment of a flat circle with center hole of approximately a 315 degree arc, more or less. The remaining segment being removed to clear rear bicycle wheel allowing movement of sail 43 about pivot spindle 21. To support web 5 in a flat pattern operating position some twenty intermediate sail stays 22, more or less, are added that radiate out from a common focal point or axis 4. Each sail stay 22 is a tube with an elliptical cross section, as shown in FIG. 7. The intermediate sail stay is the principal structural member and runs from the center circular opening of web 5 to its periphery. At the peripheral end a radial stay clip 32 is inserted into the tube section and secured to it. Lanyard stay clip 32 is bored with a single small hole through the part and is located at the periphery of web 5 to accommodate circumferential lanyard 23 radial lanyard 7. At the radial end of intermediate sail stay 22 a radial stay clip 37 is inserted into the tube and secured to it. Radial stay clip 37 is bored at the radial axis to journal with a bolt 4, as shown in FIG. 8 and FIG. 12. The twenty intermediate sail stays 22 are equally spaced about the flat pattern arc of transparent web 5. In this position a circumferential lanyard 23 is run through each peripheral hole in lanyard stay clip 32 and is secured at the ends of the arc. Stabilizing the end edges of the arc of web 5 is a right hand end sail stay brace 14 and a left hand end sail stay brace 15. Braces 14 and 15 in general have an angle cross section, FIGS. 10, 11 and 3 and run the length of web 5. They too are equally spaced with intermediate sail stays 22. End stay 34 runs from the web periphery, then common to both right and left hand end sail stay braces 14 and 15 and is extended to be journaled at the sail axis by bolt 4. The transparent web 5 extends around end stay 34 along edge of arc, FIGS. 10 and 11, and is secured with left hand end sail stay brace 14 and end stay 34 and right hand end sail stay brace 15 and end stay 34, respectively. The transparent web 5 folds over circumferential lanyard 23 around its entire periphery and is bonded together. The intermediate sail stays 22 are sandwiched between web 5 and a transparent doubler strip 38 to secure them as shown in FIG. 12. Surfaces of the web 5 and the doubler strip 38 are bonded along the edges of sail stays 22 as typically shown as reference "b", in FIG. 7.

The journal mounting 42 illustrated generally in FIGS. 6 and 8 comprises a U-shaped yoke 3 provided with a spindle at one end of a matching diameter to spindle 21. The U-shaped yoke 3 being of a width to accommodate twenty radial stay clips 37 and two end stays 34. An outer tube 20, of approximate combined length of the spindle of yoke 3 and spindle 21, journals with these parts. The outer tube 20 is secured to spindle yoke 3. Two slots opposite each other run the full lower length of tube 20 common to spindle 21. Tightening outer tube 20 at the slotted end secures outer tube 20 to spindle 21 locking it in its position. This is accomplished by installing a collar 25, FIG. 5, midway between spindle 21 and securing it to a one-half section of tube 20. Inserted at the other end of collar is installed a fitted nut 29. A bore in collar matches nut 29. A grip handle 16 with threaded end is screwed into nut 29 against wear plate 30. Wear plate 30 is flanged on top and bottom surfaces to secure its movement common with nut 29 and outer tube 20. Advancing the grip handle 16 screw tightens collar 25 locking outer tube 20 to spindle 21.

The sail 43 is journaled initially to journal mounting 42 by removing bolt 4 located at the radial arc portion (49) of yoke 3. All sail stays at the axis end are journaled by bolt 4.

Sail tension mechanism 44, illustrated generally in FIGS. 3, 10 and 11 comprise two separate shock chords 13, one on each side of the rear bicycle wheel. On the lower end shock chords 13 are secured to the right hand end sail stay brace 14 and end stay 34 on the right side and the left hand end sail stay brace 15 and end stay 34 on the left side of the bicycle sail. These stays secure the end segment sections of the flat sail web 5. The shock chords 13 are stretched over pulleys 11 and mounted by clamp 35 to upper extended arms of arm 2 at reference points "a" in FIGS. 3 and 4. The shock chords 13 are initially tensioned to hold the sail 43 in proper tension and at any new readjustment position of the sail relative to wind directions. This is accomplished by the upper arm 2 having arms that extend out, reference "a", from a common pivot about outer tube 20 and a separate pair of lower arms 12 and 24 pivoting within pivot bearings 36. The upper arms 2 are controlled by the operator's setting of the sail and the lower arms 12 and 24 automatically follow. The pivotable arm 2 has a boss on the forward end to accommodate an indexing screw 17; on the opposite end a slotted boss encasement to interface with the square stabilizer rod 6. The arm 2 is fitted with a bore to journal with outer tube 20, FIG. 8. It is held in vertical position by a washer 26 placed over outer tube 20 and secured by pin c. Washer 26 is set to permit a free rotational motion of arm 2 about tube 20. An index hole is installed in outer tube 20 to interface with index screw 17 when the extended arms of arm 2 are at right angles to the bicycle wheel. A second indexing hole interfaces outer tube 20 at a 90 degree rotation on either side of the extended arms of 2, reference "a" shown in FIGS. 4 and 8. A pivot bearing 36 is added to both outside surfaces of structure 1, FIG. 3, above the bicycle rear axle to accommodate the round pivot arms 12 and 24 respectively. These arms are free to rotate about pivot bearings 36 and are bent 90 degrees extending them outward from the structure 1 and another 90 degrees to accommodate pulleys 11. The shock chords 13 are secured by clamps 35 on the extended arms of arm 2 at reference points "a" and run from this point down over the lower outside surface of pulleys and horizontally to matching bores in both right and left hand end sail stay braces 15 and 14, respectively, and each laced through a second bore in each, FIGS. 10 and 11, and are secured by clamps 35.

Sail stabilizer 45, illustrated generally by FIGS. 4, 6 and 8 comprise a square stabilizing rod 6 attached to the accommodating slotted boss in arm 2 and extends rearward of a length slightly longer than the radial length of the sail. Journaled to stabilizer rod 6 is a lanyard mounting ring 8. This is free to slide between two stop pins 27. The center bore in lanyard mounting ring 8 is aligned with the bolt 4 of U-shaped yoke 3. A lanyard 7 is run from each sail stay location bore in part 32 through the common hole in the lanyard mounting ring 8. With the sail 43 in an extended flat pattern position radial lanyards 7 are secured equally. Into the lower surface of lanyard mounting ring 8 a threaded lock screw 9 is added and locks lanyard mounting ring 8 to stabilizing rod 6 at the desired position to maintain radial lanyards 7 in operating position. A buckled strap 28 is installed on lock screw 9 through a hole placed in the center of strap 28. It is held permanently between lanyard mounting ring 8 and the knob of the lock screw 9.

FIG. 9 illustrates a folded sail for stowage. To configure the sail for stowage the shock chords 13 are slipped off pulleys 11, of FIG. 3. Lock screw 9 is released, FIG. 6, allowing lanyard mounting ring 8 to slide on lanyard tensioning rod 6 and adapted to stop lanyard mounting ring 8 at the forward stop pin 27. The indexing screw 17, FIGS. 6 and 8 is unscrewed sufficiently to release it from outer tube 20. The screw on grip handle 16 is loosened to release outer tube 20 from spindle 21. Sail 43 is folded about pivot bolt 4 until it can be held by one hand. The sail is then rotated to be aligned with both the bicycle wheel and the lanyard tensioning rod 6 when laid horizontally. The sail forming a bundle is secured in this position with buckle strap 28, FIGS. 6 and 9. The indexing pin 17 and the handle screw 16 is tightened for mobile transporting. If it is desired instead to remove sailing apparatus 40 from the bicycle the unit is lifted off spindle 21 before grip handle screw 16 is tightened. The base 41 remains with the bicycle.

Sailing apparatus 40 structure is constructed to mount to the rear of cyclist allowing full operating vision. Sailing apparatus 40 structure is constructed to mount to the rear of cyclist to provide a wind breaker for operator in adverse weather conditions. Sailing apparatus 40 structure is constructed to provide maximum visability for the cyclist from other traffic vehicles. Sailing apparatus 40 structure is constructed to permit the cyclist to reposition the sail 45 degrees in either direction, more or less, while riding the bicycle, accomplished by unscrewing grip handle 16 approximately one-half revolution or less with one hand and shifting to a desired new position and retightening the grip handle. Sail 43 structure is constructed with sufficient opening in the lower segment allowing for a forward cycle thrust through a directional wind change range of 200 degrees.

While preferred embodiments of the invention have been described herein, it is appreciated that further variations and modifications may be made without departing from the spirit of the invention.

I claim:

1. In a bicycle having a sail, the combination comprising: an apparatus for bicycle (39) having a front wheel and rear wheel, each with an axle, to increase its forward thrust when available winds exist in a desired direction wherein said rear wheel includes a frame, said apparatus comprising; sail support means comprising a U-shaped structure (1) mounted over said rear wheel journaled at the lower ends by bores matching said rear axle, said support means secured by nuts (18) to said rear axle and secured in position by upper braces (19) interconnecting the bicycle frame with said support means, and means on the uppermost surface of said support (1) for mounting a pad (31) secured to a vertical spindle (21), said vertical spindle being concentric with an upper matching spindle having a U-shaped yoke (3), an outer tube (20) journaling both said spindle and U-shaped yoke (3) and said vertical spindle (21), the upper end of said outer tube (20) secured to said spindle and U-shaped yoke (3), the lower end of said outer tube being slotted and clamped to said spindle (21) by a surrounding collar (25), and a grip handle (16) connected to said collar, said U-shaped yoke (3) bored 90 degrees through the radial arc portion (49) of said U-shaped yoke.

2. The apparatus of claim 1, wherein said sail support means further comprises a transparent web (5) segment, and a transparent double strip (38), said web having a flat circle with a center hole and approximating a 315 degree arc forming a sail (43), said sail structured by a plurality of equally spaced intermediate sail stays (22), radial stay clips (37), lanyard stay clips (32), end stays (34), and end sail stay braces (14) (15), radiating outwardly from a common axis (4), a circumferential lanyard (23) forming the structure of the sail, said lanyard coupled to each lanyard stay clip (32) at the periphery of said sail and secured at the edges along the ends of the arc formed, the edges of said transparent web (5) secured by connecting end stays (34) and end sail stay braces (14) (15), all said intermediate sail stays (22) are captively sandwiched between said transparent doubler strip (38), radial stay clips (37) and end stays (34) which are connected in a manner to journal at a common journaled mounting axis (4) within said U-shaped yoke (3).

3. The device of claim 2, further including a means to maintain said sail (43) under constant operating tension by a sail tension mechanism (44) comprising a pair of cross arms (2) fixed in a horizontal plane and journaled to pivot about said outer tube (20), a pair of lower arms (12) (24) journaled to bearings (36) mounted to support above said rear axle on either side and free to rotate in parallel manner and acting as followers to said cross arms (2), said lower arms (12) (24) bent 90 degrees horizontally at the outer ends forming a spindle for separate pulleys (11) journaled thereto, separate shock chords (13), one on either side, connected at the outer limit of said cross arms (2), extended to run downward over the pulleys (11) then horizontally to bores in the outermost sail stays (14) (15) at the sail edges, said shock chord tensioned and secured at the ends securing sail tension.

4. The device of claim 1, wherein a means comprising a stabilizing rod (6) extending from a secured position at the pivot of arms (2) keyed for an adjustable journaled lanyard mounting ring (8), said lanyard mounting ring having a lock screw (9) and a supporting ring, said supporting ring having the bore axis common to the radial axis of said sail stays, each of said sail stays secured at the outer periphery (32) of said sail (43) and said lanyard mounting ring (8) by radial lanyards (7), said lanyard mounting ring (8) secured by a lock screw (9) on a sail stabilizing rod (6), the movement of said mounting ring (8) limited by two stop pins (27), arms (2) are secured about pivot by indexing screw (17).

5. A device of claim 1, wherein the apparatus includes means for reconfiguration from an open sail position to a stowage position.

6. A device of claim 1, wherein the apparatus mounts to the rear of the cyclist.

7. A device of claim 1, wherein the apparatus is adapted to be moved 45 degrees in either direction.

8. A device of claim 1, wherein said sail (43) provides a forward thrust through a direction wind change range of 200 degrees.

9. A device of claim 1, wherein the apparatus exerts a mean kinetic wind thrust force lower than the operator's center of gravity.

10. An apparatus in claim 1, wherein said sail comprises a somewhat circular profile and structured by a plurality of sail stays radiating outward from a common focal point.

* * * * *